US 6,612,737 B1

(12) United States Patent
Lobban

(10) Patent No.: US 6,612,737 B1
(45) Date of Patent: Sep. 2, 2003

(54) SYSTEM AND METHOD FOR SELF-CALIBRATING MEASUREMENT

(75) Inventor: Peter E. Lobban, Los Altos, CA (US)

(73) Assignee: Affymetrix, Inc., Santa Clara, CA (US)

( * ) Notice: Subject to any disclaimer, the term of this patent is extended or adjusted under 35 U.S.C. 154(b) by 0 days.

(21) Appl. No.: 09/475,209

(22) Filed: Dec. 29, 1999

(51) Int. Cl.[7] ............................. G01K 7/18; G01K 7/20; G01K 15/00
(52) U.S. Cl. ............................. 374/183; 374/1; 374/141
(58) Field of Search ................................. 374/1, 2, 141, 374/183, 163, 185; 324/104–105, 120, 601, 691

(56) References Cited

U.S. PATENT DOCUMENTS

| 4,125,023 A | | 11/1978 | Amemiya et al. ............ 73/362 |
| 4,210,024 A | | 7/1980 | Ishiwatari et al. .......... 73/362.5 |
| 4,261,037 A | * | 4/1981 | Hicks ......................... 364/464 |
| 4,288,692 A | * | 9/1981 | Schamber et al. .......... 250/310 |
| 4,364,006 A | * | 12/1982 | Makabe et al. ............. 323/353 |
| 4,528,637 A | * | 7/1985 | Smith ......................... 364/557 |
| 4,532,601 A | | 7/1985 | Lenderking et al. ........ 364/571 |
| 4,622,468 A | | 11/1986 | Stefanski et al. ........ 250/458.1 |
| 4,772,132 A | * | 9/1988 | Hofmann .................... 374/143 |

(List continued on next page.)

FOREIGN PATENT DOCUMENTS

JP         40428531    * 10/1992    ................. 374/163

Primary Examiner—Diego Gutierrez
Assistant Examiner—Gail Verbitsky
(74) Attorney, Agent, or Firm—Banner & Witcoff, Ltd.

(57) ABSTRACT

The present invention provides systems and methods for self-calibrated measurements, for example temperature sensing. The system includes a controller, a multiplexer of low on-resistance, at least two calibration reference resistors, and a current-to-frequency converter that performs self-calibrated temperature sensing with temperature sensing devices such as resistance temperature detectors (RTDs). In general, the system provides a self-calibrated temperature sensing by the current-to-frequency converter providing a constant voltage sequentially to at least two calibration resistors and one or more RTDs using switches of low on-resistance in the multiplexer, which is controlled by the controller. The value of one of the reference resistors provided is correlate to the resistive value of the RTD at the minimum temperature of the operating temperature range for the processing equipment to be monitored, the value of another reference resistor provided is correlate to the resistive value of the RTD at the maximum temperature of the operating temperature range for the processing equipment, and the values of the remaining reference resistors, if provided, may correlate to the resistive values of the RTD at selected intermediate temperatures within the temperature range for the processing equipment. The frequency output by the current-to-frequency converter varies directly with current variation and thus inversely with the resistance of the individual calibration resistor or RTD. The controller determines-composite resistance for the calibration resistors and RTDs inclusive of the other component connecting the calibration resistors and RTDs to the current-to-frequency converter, from the frequencies output by the current-to-frequency converter. A calculation is performed using these resistances to determine an accurate self-calibrated temperature for the RTDs and the equipment to which it is associated. Further, the present invention provides the measurement system may be constructed so as to provide self-calibrated temperature measurements of one or more locations in a processing chamber which may operate within different temperature ranges or to provide self-calibrated temperature measurements of one or more a processing chambers. The present invention may also provide even more accurate self-calibrated temperature measurements by utilizing multiple reference resistors so as to provide piecewise linear calibration within the temperature operating range of the processing equipment.

34 Claims, 5 Drawing Sheets

U.S. PATENT DOCUMENTS

| | | | |
|---|---|---|---|
| 5,177,696 A | * 1/1993 | Bonne | 364/557 |
| 5,315,230 A | * 5/1994 | Cordoba et al. | 323/313 |
| 5,317,520 A | * 5/1994 | Castle | 364/482 |
| 5,336,943 A | * 8/1994 | Kelly et al. | 307/310 |
| 5,377,128 A | * 12/1994 | McBean | 364/571.01 |
| 5,519,644 A | 5/1996 | Benton | 364/571.01 |
| 5,696,508 A | * 12/1997 | Gross, Jr. et al. | 341/118 |
| 5,719,378 A | * 2/1998 | Jackson, Jr. et al. | 219/497 |
| 5,822,225 A | * 10/1998 | Quaderer et al. | 364/571.01 |
| 5,829,846 A | * 11/1998 | Zeiner et al. | 374/1 |
| 5,829,876 A | * 11/1998 | Schwartz et al. | 374/1 |
| 5,929,344 A | * 7/1999 | Hays et al. | 73/861.357 |
| 5,961,450 A | * 10/1999 | Merchant et al. | 600/322 |
| 5,999,848 A | * 12/1999 | Gord et al. | 607/2 |
| 6,045,260 A | * 4/2000 | Schwartz et al. | 374/183 |
| 6,114,122 A | * 9/2000 | Besemer et al. | 435/6 |
| 6,140,859 A | * 10/2000 | Regier | 327/478 |
| 6,171,793 B1 | * 1/2001 | Phillips et al. | 435/6 |
| 6,197,595 B1 | * 3/2001 | Anderson | 436/180 |

* cited by examiner

SYSTEM AND METHOD FOR SELF-CALIBRATING MEASUREMENT

GOVERNMENT RIGHTS NOTICE

Portions of the material in this specification arose as a result of Government support under contract No. 70NANB5H 1031 between Affymetrix and the National Institute of Standards and Technology (NIST). The Government has certain rights in this invention.

BACKGROUND OF THE INVENTION

1. Technical Field of the Invention

The present invention generally relates to the field of electronic measurement. In particular, the present invention provides a system and method for self-calibrated measurement for measuring values of such things as temperature.

2. Description of the Related Art

Many means of performing electronic measurement are known and are used in a variety of applications. Such means of performing temperature measurement are included in temperature control systems that accurately measure and control temperature during various chemical processes. For example, processing equipment, such as fluidics stations or processing chambers (e.g., furnaces), may be used in preparing, testing, and/or using semiconductors and polymer arrays. These systems typically regulate, and therefore measure, the temperature of an internal chamber. Further, these systems often include temperature sensitive devices (TSDs), such as Resistance Temperature Detectors (RTDs), integrated into the processing equipment to sense the temperature of zones in the processing equipment so that the product being processed is at the proper temperature. Employment of an RTD in an application provides ease of use and a nearly linear response curve over the temperature range of interest. However, circuits used to determine the temperature of the RTD often have a drawback in that they may require calibration that involves removal of the instrument from the processing equipment and setting potentiometers with the use of an external device for temperature measurement. Thus, these circuits require tedious manual calibration that may require the equipment to be disassembled.

To overcome this tedious manual calibration process, self-calibrating temperature measurement circuits have been proposed, for example, the circuits in U.S. Pat. No. 5,519,644, U.S. Pat. No. 4,210,024, U.S. Pat. No. 4,125,023, and U.S. Pat. No. 4,532,601. However, there is a need for improved self-calibrating temperature measurement devices and methods which have a simplified design and measurement process.

SUMMARY OF THE INVENTION

The present invention provides systems and methods for self-calibrated measurements, for example temperature sensing. The systems include a controller, a multiplexer of low on-resistance, at least two calibration reference resistors, and a current-to-frequency converter, and they perform self-calibrated temperature sensing with temperature sensing devices such as resistance temperature detectors (RTDs). In general, the system provides self-calibrated temperature sensing by the current-to-frequency converter providing a constant voltage sequentially to at least two calibration resistors and one or more RTDs using switches of low on-resistance in the multiplexer, which is controlled by the controller. The value of the one of the reference resistors provided is correlate to the resistive value of the RTD at the minimum temperature of the operating temperature range of, for example, the processing equipment to be monitored, and the value of the other reference resistor provided is correlate to the resistive value of the RTD at the maximum temperature of the operating temperature range of, for example, the processing equipment. The frequency output by the current-to-frequency converter varies directly with current variation, and thus, inversely with the resistance of the individual calibration resistors or RTDs. The controller determines composite resistances for the calibration resistors and RTDs inclusive of the other component(s) connecting the calibration resistors and RTDs to the current-to-frequency converter from the frequencies output by the current-to-frequency converter. A calculation is performed using these resistances to determine an accurate self-calibrated temperature for the RTDs and the equipment to which they are associated.

In a first variation of the invention, the measurement system has at least two precision resistors, a current-to-frequency converter, and a multiplexer of low on-resistance. The measurement system produces an accurate temperature measurement of, for example a processing chamber, which is independent of multiplicative effects and additive effects of the temperature measurement circuitry by measuring frequencies when the current-to-frequency converter is connected to a first reference resistor, a second reference resistor, and an RTD. The controller then calculates the reciprocals of these frequencies to derive values proportional to the respective composite resistances, and from these values calculates a self-calibrated temperature of the RTD. Further, the temperature measurement circuit is calibrated on a continuous basis so that the remainder of the circuitry can be made up of components whose values are not precisely known and whose drift characteristics need not be tightly controlled.

In another variation of the present invention the current-to-frequency converter includes a voltage-to-frequency converter configured so that its output frequency varies in response to variations in current through a resistor connected to one of its terminals.

Another variation of the present invention provides the measurement system may be constructed so as to provide self-calibrated temperature measurements of one or more locations in a processing chamber which may operate within different temperature ranges or to provide self-calibrated temperature measurements of, for example, one or more processing chambers. This capability may be provided by including multiple calibration reference resistors, a different set of two being associated with calibrating RTDs used with different temperature ranges.

A still further variation of the present invention enables even more accurate self-calibrated temperature measurements by utilizing multiple reference resistors so as to provide piecewise linear calibration within the temperature operating range of the processing equipment. As such, the values of the plurality of reference resistors provided are correlate to the resistive value of the RTDs at various points within the operating temperature range.

DESCRIPTION OF THE PREFERRED EMBODIMENTS

The present invention provides systems and methods for self-calibrated measurements, for example temperature sensing. The systems include a controller, a multiplexer of low on-resistance, two or more calibration resistors, and a current-to-frequency converter, and they perform self-calibration temperature sensing with temperature sensing devices, e.g., resistance temperature detectors (RTDs). In general, the system provides a self-calibrated temperature sensing by the current-to-frequency converter providing a constant voltage which is switched among at least two calibration resistors.and the RTDs using the multiplexer controlled by the controller. In each case, a frequency which varies directly with current variation and which is inversely proportional to the resistance of the individual calibration resistor or RTD is output by the current-to-frequency converter to the controller, and the controller determines the resistance. A calculation is performed using these resistances to determine an accurate temperature of the RTDs and the equipment with which it is associated. The use of the at least two precision resistors, a current-to-frequency converter, and a multiplexer of low on-resistance produces an accurate temperature measurement which is independent of multiplicative effects (e.g., variations in the values of components that make up the current-to-frequency circuit) and additive effects (e.g., on-resistance of the multiplexer or lead resistance) of the temperature measurement circuitry. The temperature measurement circuit is calibrated on a continuous basis so that the remainder of the circuitry can be made up of components whose values are not precisely known and whose drift characteristics need not be tightly controlled.

Employment of an RTD in a temperature measurement application provides ease of use and a nearly linear response curve over the temperature range of interest. The characteristic that makes the RTD an effective device for measuring temperature is that it can be made with an accurately known resistance at a given temperature (typically 100 ohms at 0° C.) and an accurately known temperature coefficient of resistance (typically 0.00385 ohm per ohm per ° C.). Therefore, circuits for using an RTD to measure temperature usually entail some means for measuring the resistance of the RTD. The circuit typically drives a known current through the RTD and measures the voltage across the RTD less an offset that compensates for the resistance of the RTD at a particular temperature, for example, 0° C.

Figure 1:
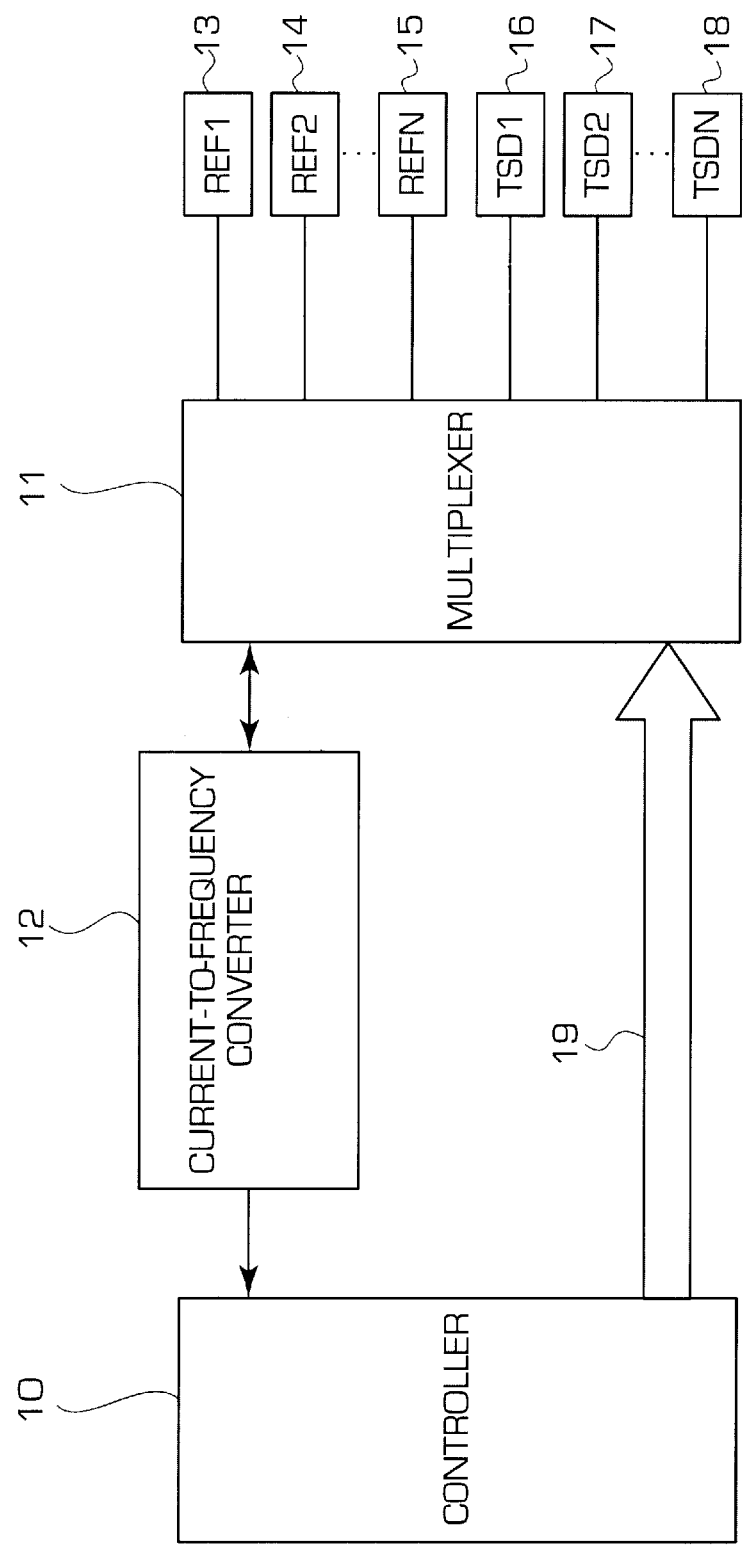
FIG. 1 is a block diagram of one embodiment of a self-calibrating temperature sensing system according to the present invention.

A first embodiment for the self-calibrating measurement system of the present invention used for measuring temperature is provided in FIG. 1. The self-calibrating measurement system includes a controller 10 coupled to a multiplexer 11. The multiplexer 11 is coupled to a plurality of reference elements, REF1 (13), REF2 (14), through REFN (15) and a plurality of Temperature Sensitive Devices (TSDs), TSD1 (16), TSD2 (17), through TSDN (18) where N is an integer. A current-to-frequency converter 12 is coupled to the multiplexer 11 and the controller 10.

The reference devices may be, for example, reference resistors such as precision resistors having a small temperature coefficient of resistance (e.g., 0.1% precision resistors). For temperature measurement the temperature sensing devices may be RTDs, and the reference resistor values may be selected to correspond to the nominal resistances of the RTDs at the temperature extremes to be measured by the self-calibrating temperature measurement system. Further, the multiplexer 11 is selected-to have low on-resistance, or substantially equal on-resistance from channel to channel, so as to minimize its influence on the accuracy of the self-calibrated temperature to be measured. Finally the current-to-frequency converter includes a constant voltage source for connection to the reference resistors and the TSDs.

In operation, the controller 10 activates the multiplexer 11 so as to continuously and sequentially switch the current-to-frequency converter 12 among the reference resistors and TSDs. Each time the current-to-frequency converter 12 is connected-to one of the reference resistors, REF1 (13)–REFN (15), or one of the TSDs, TSD1 (16)–TSDN (18), a constant voltage is provided, and the current varies inversely with the resistance. Thus, a frequency inversely proportional to the resistance of one of the reference resistors, REF1 (13)–REFN (15), or one of the TSDs, TSD1 (16)–TSDN (18), is provided to the controller 10. The controller uses the measurement of the various frequencies when the current-to-frequency converter 12 is connected to the reference resistors, REF1 (13)–REFN (15), and one of the TSDs, TSD1 (16)–TSDN (18), to calculate an accurate self-calibrated temperature of one or more TSDs, as will be explained in more detail relative to particular preferred embodiments below. So long as the parasitic resistances in series with the reference resistors, REF1 (13)–REFN (15), and the TSDs, TSD1 (16)–TSDN (18), for example the on-resistances of the multiplexer channels and the lead resistances, are low and/or substantially equal, the calculation corrects for their effects and yields an accurate value for the temperatures of the TSDs.

Figure 2:
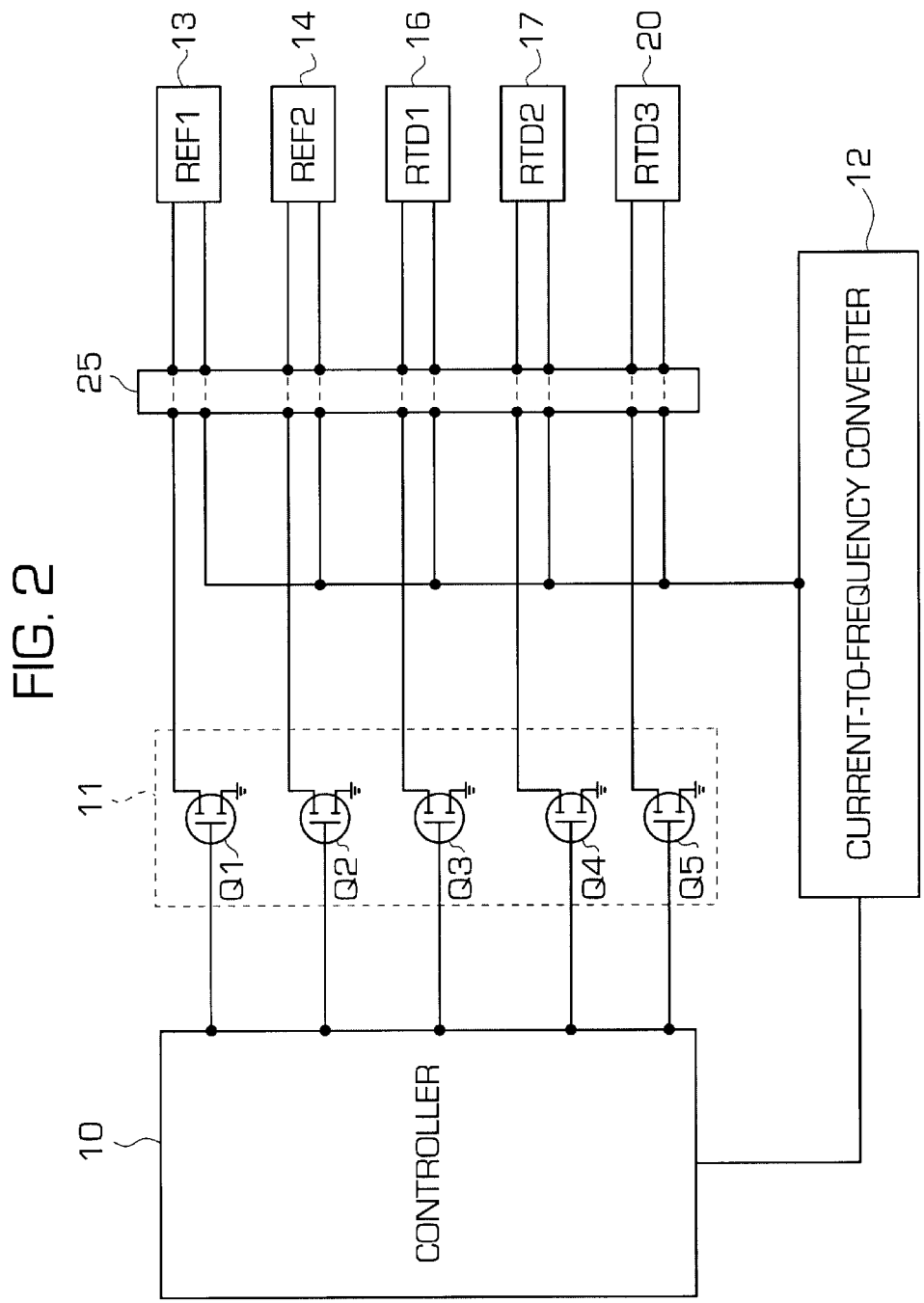
FIG. 2 is a block diagram of another embodiment of a self-calibrating temperature sensing system according to the present invention.

A second preferred embodiment for the self-calibrating measurement system of the present invention used for measuring temperature is provided in FIG. 2. The self-calibrating measurement system includes a controller 10 coupled to a multiplexer 11. Controller 10 may be a microprocessor that may include memory for storing variable information (e.g., RAM) and memory for storing an operating program (e.g., ROM). Multiplexer 11 includes five MOSFETs, Q1–Q5, with low on-resistance, having an on-resistance of for example 0.05 ohms. The gate terminal of each of the MOSFETs, Q1–Q5, is coupled to a respective one output of the controller 10. Another terminal, for example the source terminal, of each of the MOSFETs, Q1–Q5, is coupled to ground. And a third terminal, for example the drain terminal, of each of the MOSFETs, Q1–Q5, is coupled through a connector 25 to a terminal of one of reference.devices REF1 (13) and REF2 (14) or Resistance Temperature Detectors RTD1 (16), RTD2 (17), and RTD3 (20). Further, a current-to-frequency converter 12 is coupled through connector 25 to another terminal of one of reference devices REF1 (13) and REF2 (14) or Resistance Temperature Detectors RTD1 (16), RTD2 (17), and RTD3 (20), and coupled to controller 10.

Although not shown, the two reference devices, REF1 (13) and REF2 (14), are to be connected to the measurement circuit with leads of the same gauge, wire type, and wire length as the RTDs. Further, connectors of the same type may be used (e.g., connector 25). As a result, parasitic resistances will affect the measurement of the resistances of REF1 (13) and REF2 (14) in the same way, at least to first order, as the resistances of the RTDs and provide a more accurate self-calibrated measurement.

In operation, the temperature measurement system measures temperature without the need for external calibration. It measures, in quick succession, the resistance of the RTDs RTD1 (16), RTD2 (17) and RTD3 (20) and the respective resistances of REF1 (13) and REF2 (14), for example high-accuracy (precision) reference resistors, having values corresponding to the nominal resistances of the RTD at 0° C. and 50° C., the extremes of the range over which the temperature needs to be measured. The quick succession of measurement is done by the controller 10 activating each of the respective transistors, Q1–Q5, of multiplexer, 11 sequentially to connect each device, for example resistors, in turn to a current-to-frequency converter (CFC) 12. The CFC's output frequency is directly proportional to the conductance of the respective resistors, REF1 (13), REF2 (14), RTD1 (16), RTD2 (17) and RTD3 (20). By measuring the corresponding output frequencies and by applying a formula to calculate the temperature from the measured values, a self-calibrated temperature reading is-obtained as described in more detail below.

Figure 3:
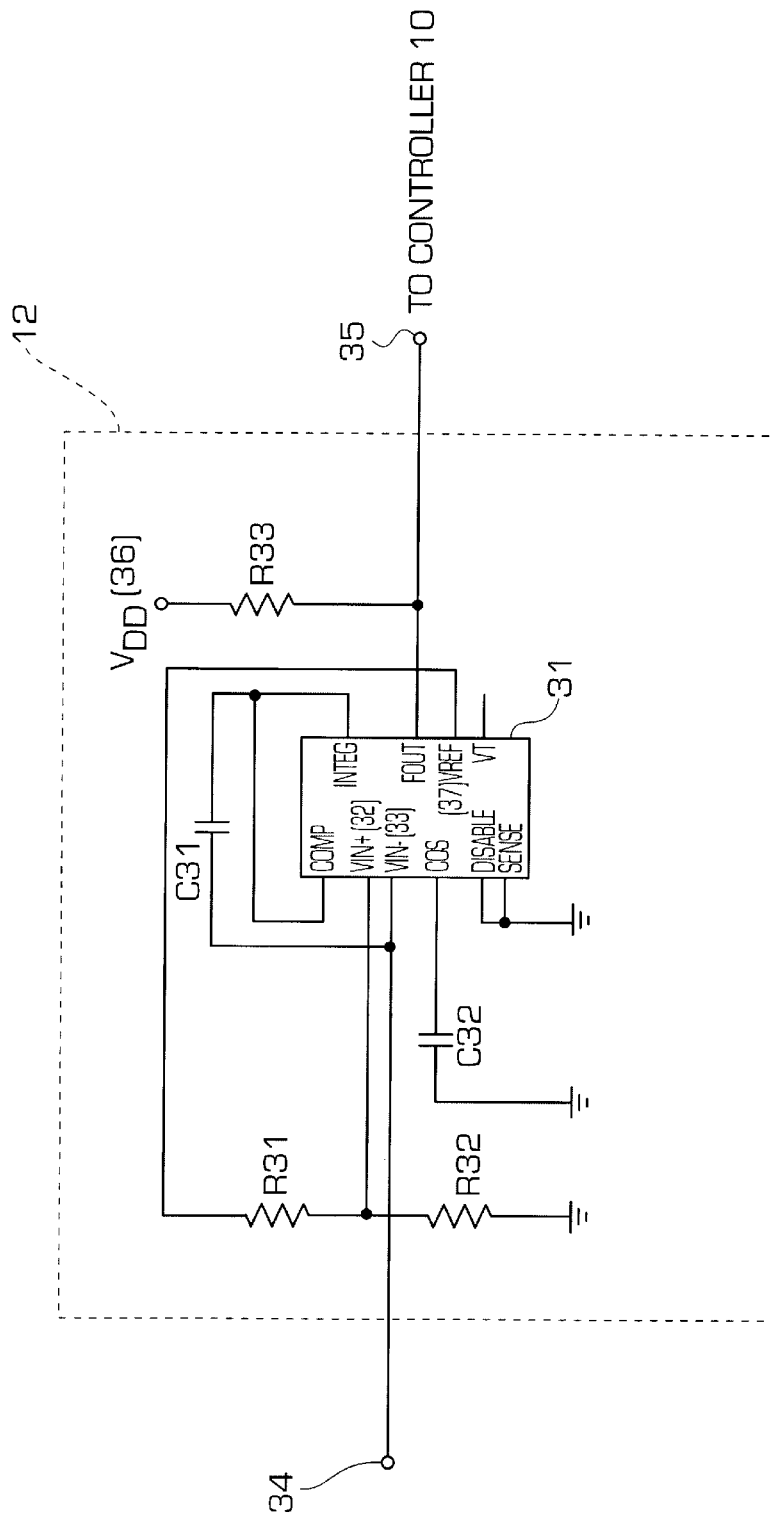
FIG. 3 is a circuit schematic of one embodiment for the current-to-voltage converter of the self-calibrating temperature sensing system according to the present invention.

Referring to FIG. 3, the current-to-frequency converter (CFC) 12 for the self-calibrated measurement circuit of the present invention may include a voltage-to-frequency converter (VFC) 31 configured in such a way so as to vary its output frequency in response to changes in current through the reference devices (REF1–REFN) and RTDs. As one example, the CFC 12 may include a VFC 31, for example a VFC121 by Burr-Brown, which has its reference voltage output (VREF) 37 coupled to a pair of resistors R31 and R32, which may be precision resistors. The voltage at the terminal between R31 and R32 is provided to the VIN+ input terminal 32 of the VFC 31. The terminal VIN− 33 of the VFC 31 is coupled to the integrate terminal INTEG of the VFC 31 via a capacitor C31. The INTEG terminal is also connected to the comparator input terminal COMP of the VFC 31. A capacitor C32 is connected to the one-shot timing terminal COS of the VFC 31. The FOUT terminal of the VFC 31 is connected to pull-up resistor R33 which is connected to $V_{DD}$ 36, and provides a varying frequency signal to output terminal 35 of the CFC 12 that couples to controller 10. The VIN− 33 terminal of the VFC 31 provides a constant voltage to terminal 34 of the CFC 12 which is coupled to various reference devices (REF1–REFN) and RTDs under control of the multiplexer 11.

As configured, the VFC 31 (and thereby the CFC 12) operates so as to make the voltage across a reference resistor (REF1–REFN) or RTD constant and substantially equal to the voltage at the junction of R31 and R32, and measures the current through the resistor via the current through terminal 34 of CFC 12. Although the constant voltage provided by dividing the VREF 37 voltage by R31 and R32 is not necessarily accurately known, it does not adversely impact the accuracy of the self-calibrated measurement because it affects each frequency output by the CFC 12 proportionately. The VFC 31 configuration also allows a single multiplexer to do all the switching necessary. The resistance of the calibration reference device (REF1–REFN) or the RTD (RTD1–RTDN) selected by the multiplexer 11 at a particular time is measured by placing the calibration reference device (REF1–REFN) or the RTD (RTD1–RTDN) in the part of the VFC 31 circuitry that sets the scale factor. The frequency of the output of the VFC 31 (and thereby the CFC 12) is directly proportional to the current through the resistance being measured, so the resistance is inversely proportional to the frequency output from the VFC FOUT terminal (and thereby the CFC 12 terminal 35). Thus, in the present invention a VFC 31 may be constructed so as to operate as a CFC 12 and provide a constant voltage across the various VREFs and RTDs so as to measure a current through them and determine their respective resistance. A detailed discussion of the methods for achieving accurate self-calibrated temperature measurements with the present invention measurement systems follows.

Calibration of the self-calibration measurement system described in the first and second embodiments of FIGS. 1 and 2 is carried out automatically by the controller 10 using the reference devices pair-wise, for example precision reference resistors REF1 (13) and REF2 (14). The first reference resistor REF1 (13) may provide a reference value for the low end of a measurement range, for example 0° C., and a second reference resistor REF2 (14) may provide a reference value for the high end of a measurement range, for example 50° C., for the RTD sensor. During each cycle of operation the controller 10 measures the frequency of the output of the CFC 12 with a particular resistor selected by the multiplexer 11, for example REF1 (13), obtaining a number proportional to the conductance of the resistor in series with its leads, connector contacts, and the multiplexer 11 switch circuit (e.g., MOSFET). Taking the reciprocal of the frequency gives a number proportional to the resistance of the series combination. Let that number be called R'. Then R' can be divided into a component R proportional to the resistance of the element of interest and a component ΔR proportional to the resistance of the combined series elements, so that $$R'_{50} = R_{50} - \Delta R_{50}$$
$$R'_0 = R_0 - \Delta R_0 \quad (1)$$
$$R'_R = R_R - \Delta R_R$$

where the subscript 50 identifies the reference resistor simulating an RTD at 50° C., the subscript 0 identifies the reference resistor simulating an RTD at 0° C., and the subscript R identifies the RTD whose temperature is sought, respectively. To the extent that the resistance of the RTD changes linearly with temperature (an excellent assumption in the range of 0–50 assumed here), the formula for the temperature T of the RTD is $$T = 50 \frac{R_R - R_0}{R_{50} - R_0} \quad (2)$$

Substituting from equations (1) and making the first-order assumption that all three ΔR terms are equal (a good assumption, when all three are small relative to the resistance of the RTD and the reference resistors, REF1 and REF2, and the same types of cables, connectors, and MOSFETs are used throughout), we have $$T = 50 \frac{R'_R - R'_0}{R'_{50} - R'_0} \quad (3)$$

which is directly calculable from the measurements. This equation, equation 3, is used by the controller, 10 to calculate the self-calibrated temperature of an RTD used in, for example, processing equipment. It will be appreciated that since each of $R'_0$, $R'_{50}$, and $R'_R$ is inversely proportional to the constant voltage applied to the respective resistive element by the CFC 12, the value of that voltage does not affect the temperature calculated.

For example, a self-calibrated temperature measurement for a temperature range of 0° C.–50° C. may be obtained by first sequentially measuring the current through REF1 (13), REF2 (14) and the RTDs using the CFC 12 to output a frequency which is inversely proportional to the resistance of each measured device. Then the controller 10 computes the R' of each device, i.e., $R'_0$, $R'_{50}$, and $R'_R$, taking the reciprocal of the frequencies obtained. The controller 10 then calculates an accurate self-calibrated temperature using equation 3.

Figure 4:
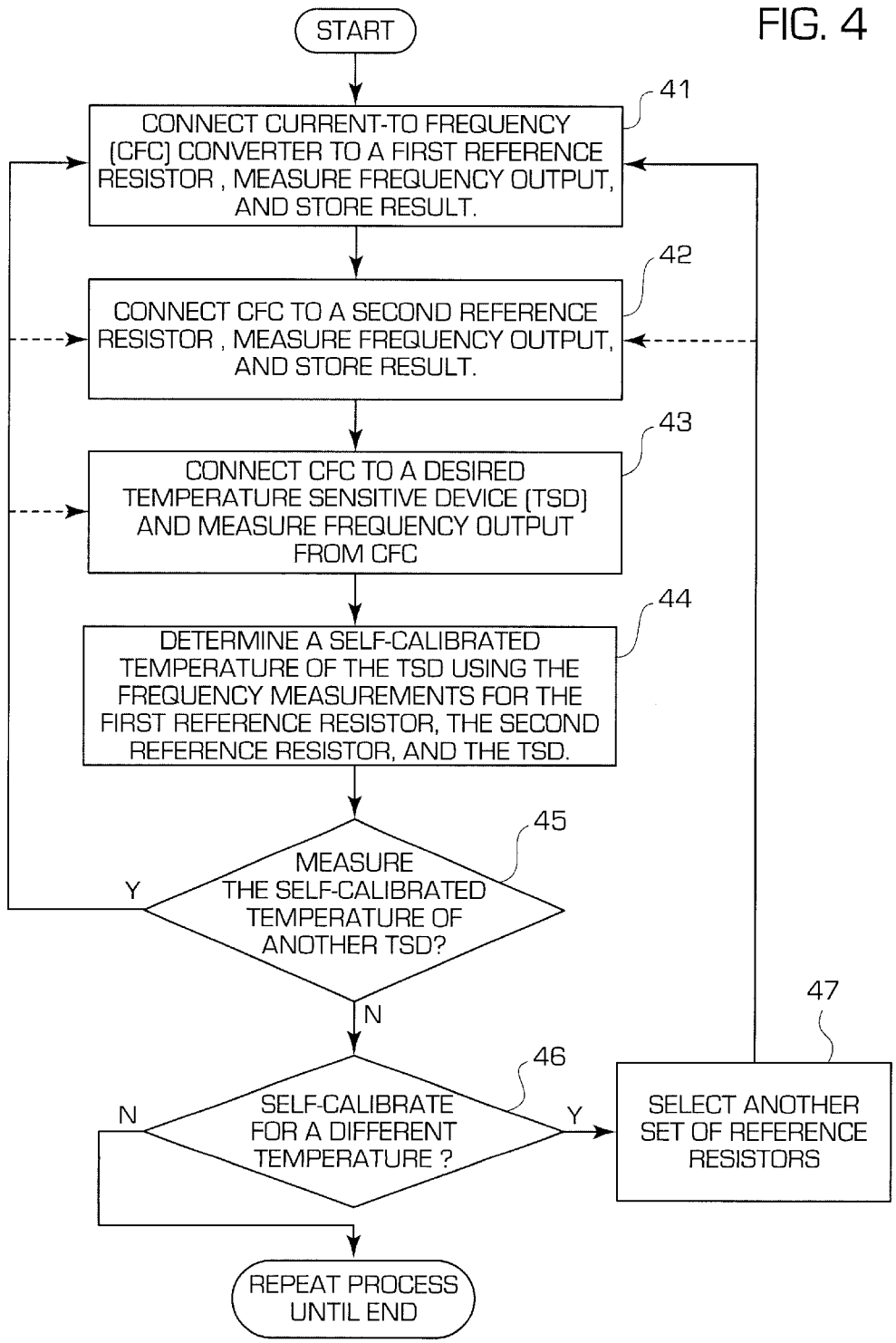
FIG. 4 is a flow diagram for one method of operating a self-calibrating temperature sensing system according to the present invention.
Figure 5:
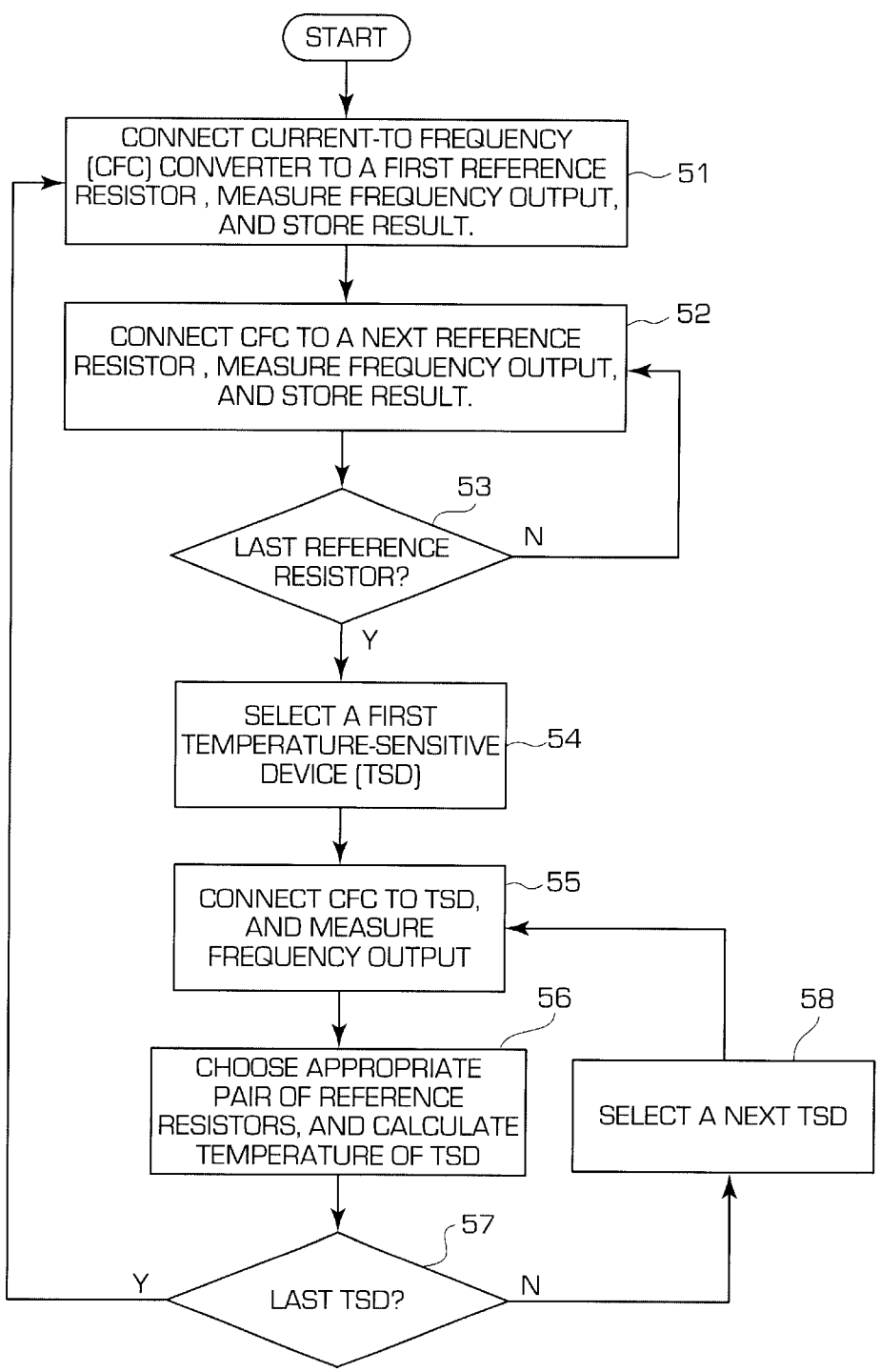
FIG. 5 is a flow diagram for another method -of operating a self-calibrating temperature sensing system according to the present invention.

Although the example method described above gives a specific example for a self-calibrating temperature measurement system utilizing two reference resistors and three RTDs for one processing apparatus with an operating temperature range of 0° C. to 50° C., the present invention may utilize more than two reference devices, measure any temperature range, and be applied to RTDs in, for example, a number of different processing apparatus as illustrated in the method described in FIG. 4 and/or provide a more accurate measurement system utilizing piecewise-linear calibration as illustrated in the method described in FIG. 5.

Referring now to the flow chart in FIG. 4, the self-calibrated measurement system of the present invention may include a plurality of reference resistors and a plurality of RTDs located in one or more processing chambers and may be operated so as to provide self-calibrated measurements within a number of different temperature ranges. First, at step 41, the CFC 12 is connected to a first reference resistor, e.g., REF1 (13), and the controller 10 measures the frequency output by the CFC 12 and stores it in memory. Next, at step 42, the CFC 12 is connected to a second reference resistor, e.g., REF2 (14), and the controller 10 measures the frequency output by the CFC 12 and stores it in memory. Then, at step 43, the CFC 12 is connected to a desired TSD, e.g., TSD1 (16), and the controller 10 measures the frequency output by the CFC 12. The frequency measured for the TSD may be stored in memory. Next, at step 44, the controller 10 determines a self-calibrated temperature for TSD1 (14) using the frequency measurements for the first reference resistor, REF1, the second reference resistor, REF2, and the TSD1. To determine the self-calibrated temperature of the TSD the controller 10 takes the reciprocal of the respective frequencies so as to get values proportional to the respective resistances. The controller inserts these calculated resistances into, for example, equation 3 above and thereby calculates the self-calibrated temperature of TSD1. This self-calibrated temperature measurement may then be used as an accurate real-time chamber temperature for controlling the processing chamber to a desired operating temperature.

Then, at decision step 45, the measurement system determines whether another TSD, e.g., TSD2 (17), used for the same temperature range, needs to be tested to determine its self-calibrated temperature. If so, the process is returned to either step 41, step 42, or step 43 for further measurements. If not, decision step 46 is performed. At step 46, the measurement system determines whether self-calibration is needed for a different temperature range required, for example, by a different portion of the processing chamber or by a different processing chamber. If so, at step 47, the measurement system selects another set of reference resistors that correlates with the different temperature range and returns to step 41 or step 42 for measuring the frequency of, for example, another pair of reference resistors, e.g., REF3 and REF4. Note that return to step 42 may be appropriate in the case one of the previously measured reference devices, e.g., REF1, correlates to both the minimum temperature of one range and the maximum temperature of another range to which two different TSDs are directed. On the other hand, if there is not another temperature range to be tested, then the process repeats as long as there is need for determining and regulating the processing equipment temperature.

Referring now to the flow chart in FIG. 5, a method for determining an even more accurate self-calibrated temperature is provided. In this case multiple reference devices, for example reference resistors, are used to provide a self-calibration curve for a particular operating range of, for example, one processing chamber. Rather than a single pair of reference resistors representative of the TSD at the extremes of the processing equipment operating range, multiple reference resistors are provided which are each representative of the TSD at particular incremental points throughout the desired operating temperature range. Thus, the measurement-system thinks of the reference resistors as a set of calibrators for establishing a piecewise-linear calibration curve that serves for determining the temperature of any of one or more TSDs used for measuring the temperature of, for example, a processing chamber.

First, at step 51, the CFC 12 is connected to a first reference resistor, and a frequency indicative of the first resistor is stored in a memory. Then, at step 52, the next reference resistor is connected to the CFC 12, and a frequency is stored in memory. At decision step 53, a determination is made as to whether there are any more reference resistors that have not been checked. If so, the CFC is connected to another reference resistor at step 52 until all have been checked and a respective frequency stored in memory. Once all reference resistors have been tested, then at step 54 a first TSD is selected. Next, at step 55 the CFC 12 is connected to the selected TSD and a corresponding frequency is measured. This frequency may be stored in memory. Note that the measurements made for the resistance of the reference resistors and the TSDs include various resistances and non-idealities of the various measurement circuit elements.

Next, at step 56, the controller 10 chooses an appropriate pair of reference resistors to calculate the self-calibrated temperature of the given TSD, as explained here. First, the set of reference resistors is searched to fine the one which, when connected to the CFC, leads to the largest output frequency that is still smaller than the output frequency measured when the given TSD is connected to the CFC, referred to herein as $f_{lb}$. Second, the set of reference resistors is search to find the one reference resistor whose output frequency is the smallest that is still larger than the frequency measured with the given TSD is connected, herein referred to as $f_{sa}$. A unique pair of resistors is always obtained so long as the given TSD is at a temperature within the temperature range over which the reference resistors have been provided. Then the temperature of the TSD is calculated by linear interpolation.

For the linear interpolation, the equation described above requires generalization. Let $f_{lb}$=output frequency from the first of the above two reference resistors $T_{lb}$=temperature corresponding to the value of that reference resistor $f_{sa}$=output frequency from the second of the reference resistors $T_{sa}$=temperature corresponding to the value of that resistor $f_u$=output frequency from the TSD whose temperature is to be determined $T_u$=temperature calculated for that TSD The equation for linear interpolation is then:

$$T_u = T_{sa} + (T_{lb} - T_{sa}) * (1/f_u - 1/f_{sa})/(1/f_{lb} - 1/f_{sa}) \quad (4)$$

Thus, generalized equation 4 provides the even more accurate self-calibrated temperature of a selected TSD. This measurement may be stored in memory.

Next, at decision step 57, a determination is made as to whether all the TSDs have been tested and a self-calibrated temperature calculated for them. If not, at step 58 another TSD is selected and tested until a self-calibrated temperature has been calculated for all the TSDs. If all TSDs have been tested then the temperature measurement system returns to step 51 for another cycle as long as the operating temperature of, for example a processing chamber, is to be monitored. Thus, in this preferred embodiment an even more accurate self-calibrated temperature sensing can be provided by determining the frequencies of more than two calibration reference resistors where linear interpolation is performed for the various TSDs.

The temperature of the reference resistors may provide some error in the self-calibrated temperature measurements. However, if the temperature measurements are being made to enable the temperature of a chamber to be controlled to a fixed set-point, as is used for many types of processing equipment, then the thermal drift of the reference resistors may be reduced as a factor by inserting the reference resistors into the controlled chamber.

The self-calibrated measurement system of the present invention is particularly useful in controlling the temperature during manufacture, automated handling, and use of polymer arrays, for example, DNA probe arrays for hybridization analysis. For example, a self-calibrating temperature measurement system may be used in keeping the temperature of a polymer array constant as it is being made, exposed to target solution, washed, and/or scanned. The self-calibrating temperature system may be incorporated into a fluidics station used for polymer array hybridization, staining, or washing, such as the fluidics stations described in U.S. patent application Ser. Nos. 08/624,132 and 09/070,689 which are herein incorporated by reference for all purposes. Further, the self-calibrating temperature measurement system of the present invention may be used in equipment for automated handling of DNA probes, e.g., an autoloader for automatically loading a probe array into a scanner such as those scanners described in, for example, U.S. patent application Ser. Nos. 09/383,986 and 08/856,642, and U.S. Pat. No. 5,631,734 issued to Stern et al, which are hereby incorporated herein by reference for all purposes. Another application for the self-calibrating temperature measurement system of the present invention is a polymer array hybridization oven as described in U.S. patent application Ser. Nos. 09/016,564, and 09/32,724, which are hereby incorporated herein by reference for all purposes.

Many other advantageous applications for measurement using such a self-calibrating measurement system are possible, particularly during polymer array synthesis processes. Various techniques for large scale polymer synthesis are known. See for example, U.S. Pat. Nos.: 5,143,854, 5,242,979, and 5,252,743. Briefly, one methodology includes attaching photo-removable groups to the surface of a substrate, exposing selected regions of the substrate to light to activate those regions, attaching a monomer with a photo-removable group to the activated regions, and repeating the steps of activation and attachment until polymers of the desired length and sequences are synthesized. See also U.S. Pat. Nos. 5,324,663, 5,384,261, 5,405,783, and 5,412,087. Additional methods and techniques applicable to the array synthesis of polymers have been described in U.S. Pat. Nos. 5,424,186, 5,445,934, 5,451,683, 5,482,867, 5,489,678, 5,491,074, 5,510,270, 5,527,681, 5,550,215, 5,571,639, 5,593,839, 5,599,695, 5,624,711, 5,631,734, 5,677,195, 5,744,101, 5,744,305, 5,753,788, 5,770,456, 5,831,070, and 5,856,011. These patent applications relating to polymer array synthesis are hereby incorporated by reference. The self-calibrating measurement system according to the present invention may be used in any processing equipment in the various steps of the polymer array synthesis process.

Although particular embodiments of the present invention have been shown and described, it will be understood that they are not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims. For example, those skilled in the art would appreciate that the method could be extended to any measurement using a resistive measuring device that is sufficiently close to linear in its response characteristics. In particular, it could be made to apply to any measurement device that is resistive in nature and changes resistance in a substantially linear fashion with a physical parameter to be measured. Also, measurement of the reference resistors need not be made as frequently as of the RTDs, so that, for example, during each measurement cycle only one reference resistor need be measured, with a different one measured each cycle until all have been measured.

All publications, patents, and patent applications cited herein are hereby incorporated by reference in their entirety for all purposes.

What is claimed is:

1. A measurement system, comprising:
   a first reference device constructed and arranged to produce a first reference current;
   a second reference device constructed and arranged to produce a second reference current;
   a linear sensing device constructed and arranged to produce a measurement current indicative of a value to be measured;
   a current-to-frequency converter constructed and arranged to convert the first reference current, the second reference current, and the measurement current to their corresponding frequency;
   a multiplexer constructed and arranged to alternately couple said current-to-frequency converter to said first reference device, said second reference device, and said linear sensing device;
   a voltage-to-frequency converter;
   a voltage input on said voltage-to-frequency converter;
   a reference voltage output from said voltage-to-frequency converter; and
   a pair of resistors arranged to divide a reference voltage from said reference voltage output of said voltage-to-frequency converter;
   wherein:
      said current-to-frequency converter includes said voltage-to-frequency converter configured so that an output frequency of said current-to-frequency converter varies with the measurement current input into said current-to-frequency converter;

said pair of resistors supply the reference voltage to said voltage input on said voltage-to-frequency converter; and said voltage-to-frequency converter provides a constant output voltage to said first reference device, said second reference device, and said linear sensing device based on the reference voltage.

2. The measurement system as claimed in claim 1, wherein said first reference device is a first reference resistor and said second reference device is a second reference resistor.

3. The measurement system as claimed in claim 2, wherein said linear sensing device is an RTD.

4. The measurement system as claimed in claim 3, further comprising:

a controller coupled to said multiplexer and coupled to said current-to-frequency converter.

5. The measurement system as claimed in claim 4, wherein said controller controls said multiplexer to alternately couple said first reference resistor, said second reference resistor, and said RTD to said current-to-frequency converter via said multiplexer and determines a self-calibrated temperature measurement of said RTD.

6. A method for measurement, comprising:

connecting a current-to-frequency converter to a first reference resistor and measuring a first frequency output by said current-to-frequency converter;

connecting said current-to-frequency converter to a second reference resistor and measuring a second frequency output by said current-to-frequency converter;

connecting said current-to-frequency converter to a first linear sensing device constructed and arranged to sense temperature and measuring a third frequency output by said current-to-frequency converter;

determining a first self-calibrated temperature measurement using said first frequency, said second frequency, and said third frequency; and measuring temperatures in a different temperature range than a temperature range associated with said first reference resistor and said second reference resistor, wherein the measuring of temperatures in the different temperature range includes connecting said current-to-frequency converter to additional reference resistors and measuring respective frequencies.

7. The method as claimed in claim 6, wherein said current-to-frequency converter includes a voltage-to-frequency converter configured so that an output frequency of the current-to-frequency converter varies with a current indicative of the temperature to be measured.

8. The method as claimed in claim 7, wherein said first linear sensing device is an RTD.

9. A method for measurement, comprising:

connecting a current-to-frequency converter to a first reference resistor and measuring a first frequency output by said current-to-frequency converter;

connecting said current-to-frequency converter to a second reference resistor and measuring a second frequency output by said current-to-frequency converter;

connecting said current-to-frequency converter to a first linear sensing device constructed and arranged to sense a property indicative of a value to be measured and measuring a third frequency output by said current-to-frequency converter;

determining a first self-calibrated measurement of the value to be measured using said first frequency, said second frequency, and said third frequency; and performing a piecewise-linear calibration by connecting said current-to-frequency converter to additional reference resistors and measuring respective frequencies.

10. The method as claimed in claim 9, further comprising the steps of:

connecting said current-to-frequency converter to a second linear sensing device constructed and arranged to sense a property indicative of a second value to be measured and measuring a fourth frequency output by said current-to-frequency converter; and determining a second self-calibrated measurement of the second value using said first frequency, said second frequency, and said fourth frequency.

11. The method as claimed in claim 10, wherein said current-to-frequency converter includes a voltage-to-frequency converter configured so that an output frequency of the current-to-frequency converter varies with a current indicative of the first value or the second value to be measured.

12. The method as claimed in claim 11, wherein said first linear sensing device is an RTD and said second linear sensing device is an RTD.

13. An apparatus comprising:

a fluidics station constructed and arranged to hold a polymer array; and a measurement system constructed and arranged to sense a property indicative of a value to be measured in said fluidics station, wherein said measurement system includes:

a first reference resistor constructed and arranged to output a first current;

a second reference resistor constructed and arranged to output a second current;

a linear sensing device constructed and arranged to output a third current indicative of the value to be measured; and a current-to-frequency converter connected to said first reference resistor, said second reference resistor, and said linear sensing device, wherein the current-to-frequency converter converts the first current, second current, and third current to their corresponding frequency;

wherein a self-calibrated measurement of the value to be measured is determined based on the first frequency, the second frequency, and the third frequency.

14. The apparatus as claimed in claim 13, wherein said linear sensing device is an RTD.

15. The apparatus as claimed in claim 14, further comprising a multiplexer constructed and arranged to alternately couple said current-to-frequency converter to said first reference resistor, said second reference resistor, and said RTD.

16. The apparatus as claimed in claim 15, further comprising a controller coupled to said multiplexer and to said current-to-frequency converter.

17. The apparatus as claimed in claim 16, wherein said controller controls said multiplexer to-alternately couple said first reference resistor, said second reference resistor, and said RTD to said current-to-frequency converter via said multiplexer and determines a self-calibrated temperature measurement of said RTD.

18. The apparatus as claimed in claim 13, further comprising a multiplexer constructed and arranged to alternately couple said current-to-frequency converter to said first reference resistor, said second reference resistor, and said linear sensing device.

19. The apparatus as claimed in claim 18, further comprising a controller coupled to said multiplexer and to said current-to-frequency converter.

20. The apparatus as claimed in claim 19, wherein said controller controls said multiplexer to alternately couple said first reference resistor, said second reference resistor, and said linear sensing device to said current-to-frequency converter via said multiplexer and determines a self-calibrated measurement of said linear sensing device.

21. The apparatus as claimed in claim 13, further comprising an autoloader for loading the probe array into the fluidics station.

22. A measurement system, comprising:
- a first reference device;
- a second reference device;
- a linear sensing device constructed and arranged to sense a property indicative of a value to be measured;
- a voltage-to-frequency converter that provides a constant voltage to said first reference device, said second reference device, and said linear sensing device based on a first reference voltage; and
- a multiplexer constructed and arranged to couple said voltage-to-frequency converter to said first reference device, said second reference device, and said linear, sensing device.

23. The measurement system of claim 22, wherein said voltage-to-frequency converter is configured so that an output frequency varies with a measured current.

24. The measurement system of claim 22, wherein the first reference voltage output of said voltage-to-frequency converter is divided by a pair of resistors to supply the first reference voltage to a voltage input of said voltage-to-frequency converter.

25. The measurement system of claim 22, wherein said voltage-to-frequency converter is part of a currency-to-frequency converter.

26. The measurement system of claim 22, wherein said linear sensing device is an RTD.

27. The measurement system of claim 25, wherein said linear sensing device is an RTD.

28. The measurement system of claim 27, further comprising a controller coupled to said multiplexer and to said current-to-frequency converter.

29. The measurement system of claim 28, wherein said controller controls said multiplexer to alternately couple said first reference device, said second reference device, and said linear sensing device to said current-to-frequency converter via said multiplexer.

30. The measurement system of claim 22, wherein said first reference device is a first reference resistor and said second reference device is a second reference resistor.

31. The measurement system of claim 30, wherein said linear sensing device is an RTD.

32. The measurement system of claim 31, wherein said voltage-to-frequency converter is part of a current-to-frequency converter.

33. The measurement system of claim 32, further comprising a controller coupled to said multiplexer and to said current-to-frequency converter.

34. The measurement system of claim 33, wherein said controller controls said multiplexer to alternately couple said first reference resistor, said second reference resistor, and said RTD to said current-to-frequency converter via said multiplexer and determines a self-calibrated temperature, measurement of said RTD.

* * * * *